BALANCED SENSE LINE PERMANENT MEMORY SYSTEM
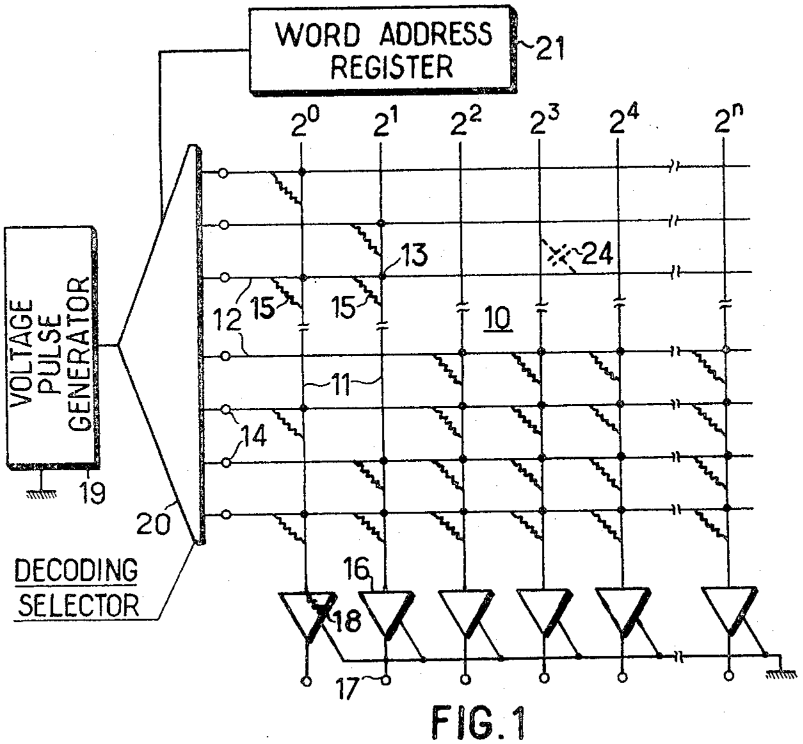
FIG. 1
FIG. 2
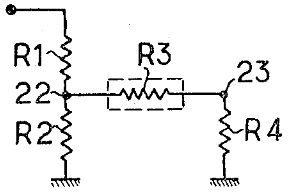
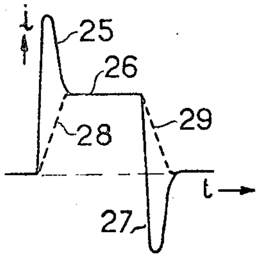
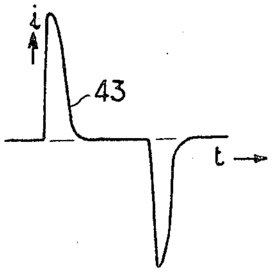
FIG. 4a FIG. 4b
Inventor:
Charles Antoine Marius David
BY Baldwin & Wight
Attorneys May 14, 1968 C. A. M. DAVID 3,383,663

BALANCED SENSE LINE PERMANENT MEMORY SYSTEM

Filed Sept. 14, 1964 2 Sheets-Sheet 2

Inventor:
Charles Antoine Marius David
BY Baldwin & Wight
Attorneys

United States Patent Office 3,383,663
Patented May 14, 1968

3,383,663

BALANCED SENSE LINE PERMANENT MEMORY SYSTEM

Charles Antoine Marius David, Paris, France, assignor to Compagnie des Machines Bull (Societe Anonyme), Paris, France Filed Sept. 14, 1964, Ser. No. 396,244
Claims priority, application France, Sept. 27, 1963, 948,895
1 Claim. (Cl. 340—173)

ABSTRACT OF THE DISCLOSURE

In a matrix permanent memory system for storing *m* words, each of *n* bits, resistive elements effect couplings between each of the *m* word conductors and some of the *n* column conductors. In view of cancelling undesirable signals due to capacitive couplings, a second column conductor is provided for each bit position, parallel to the corresponding first column conductor. In each output amplifier, two oppositely coupled primaries of a transformer are connected to said first and second column conductors and the secondary completes, in association with a single transistor, a differential amplifier with very low input impedance.

The present invention relates to permanent memories for storing data in coded form.

In information processing systems, it is often necessary to have immediately available, at order, one of a number of previously stored data. These data in combination may constitute a repertory of functions, a table of instructions or other similar constant values. In accordance with another aspect, such a system may also be regarded as an encoding device. It has thus been established that in the selective application of a control signal to one of its inputs, allocated to the desired datum, there is set up at its output terminals a configuration of electric signals representing this data in accordance with the predetermined code. In many applications, the fixed nature of the principle inherent in the immutable registration of information makes it necessary for the permanent store to be endowed with a large storage capacity. In addition, it may be useful for the time of access to a selected item of information to be as short as possible, in other words, for the extraction-reading cycles to be able to succeed one another at an extremely high repetition frequency.

Permanent storage devices or encoding devices have already been constructed in the form of matrices of conductors employing capacitive or inductive couplings, at certain crossing points of the conductors, in order to transmit energy to output terminals of the device when one of the input terminals receives an appropriate excitation signal. Now, when coupling elements constituting energy storage centres are employed in such devices, the transient effects which they involve produce deformations of the edges of the signals and time delays, the result of which is that a large storage capacity becomes incompatible with the desirable rapidity of operation.

Matrices comprising resistive couplings have therefore been proposed. In particular, encoding devices comprising crystal diodes are currently employed, but by reason of the internal capacitance of this type of diode, it is difficult to satisfy the aforesaid requirements without losing the advantages resulting from the non-linearity of the diodes. On the other hand, from the viewpoint of cost, it is found that it is the use of couplings elements having purely ohmic resistance that reduces the cost of production of a minimum.

For the sole purpose of achieving the aforesaid objects, the conclusion, not evident a priori, may be reached that the use of purely resistive coupling elements leads to the production of the best results, apart from the low overall energy yield. Neverthless, it is necessary to take account of other factors. In the first place, there is the fact that there must be connected to each output of the permanent store an amplifying device, or transducer, or temporary storage device, such a device inevitably having a certain input resistance or impedance, which may be denoted by *r* for the moment. On the other hand, account must be taken of the unavoidable parasitic couplings, the effect of which will be that undesirable signals will be set up at the outputs corresponding to binary Os, while ideally no signal should appear at these outputs. It is obviously easy to ensure that each output amplifier responds only to the reception of a signal whose amplitude exceeds a certain threshold level. However, it is necessary to choose in advance a minimum ratio between the amplitude of a useful signal representing a binary "1" and the amplitude of an undesirable signal representing a binary "0." This ratio 1:0 may be denoted by *d*. Let K be the ratio R:*r*, where R represents the ohmic resistance of each of the resistive coupling elements and *r* the input resistance or impedance of the device connected to each output terminal of the matrix. It can readily be shown that K is proportional both to *d* and to the number *m* of words which it is desired to store in the same matrix. This means that a fairly high ratio K will correspond to a large storage capacity. Since it is desirable that R should not be too high, in particular in order to minimise the voltage drift to be applied to the selected input of the matrix, it is essential for *r* to be as low as possible.

Consequently, in accordance with the invention, there is provided a permanent storage arrangement for storing a number *m* of data, or words, each composed of a number *n* of binary positions, comprising a number *m* of word conductors, a number *n* of column conductors, disposed approximately orthogonally in relation to the word conductors, resistive coupling elements effecting a resistive coupling at the crossings of each word conductor with the column conductors, but only at such crossings where a particular binary value must be present in accordance with the word assigned to this conductor and in accordance with the coding adopted in the arrangement, all the resistive elements having the same ohmic resistance (R), and a number *n* of threshold value amplifiers, each column conductor being connected to the input of an associated amplifier, each of the latter having an input impedance much lower than the resistance (R) of each resistive element.

For this application, there may be preferably employed, although this is not essential, the amplifier-storage device described in U.S. patent application Ser. No. 374,496 filed June, 11, 1964, now Patent No. 3,300,657.

When storage capacities of more than one thousand words are envisaged, it is normal to apply mechanised production methods compatible with the desired cost and overall dimensions. These methods generally result in a construction in which the word conductors are fixed on a face of a relatively thin insulating sheet and the column conductors orthogonally on the other face. In this case, each crossing point of the conductors becomes the equivalent of a small electric capacitor. It is clear that it is desirable to eleminate the effects of these parasitic capacitances if a very short operating cycle is required.

Therefore, in accordance with another aspect of the invention, in an arrangement as described above in which each crossing of a word conductor exhibits, by virtue of its construction, an undesirable capacitance having regard to the operating frequency, there is added for each binary position a second column conductor identical to the first, but having no resistive coupling to the crossed word conductors, and in which each output amplifier comprises input members connected to the first and second corresponding column conductors, and adapted to eliminate the effects of the transient capacitive currents when voltage is applied to and cut off from a word conductor.

A particularly advantageous means of effecting the elimination of the capacitive currents is to provide in each of the previously indicated amplifiers two inverted primary windings on the input transformer.

For a better understanding of the invention and the manner in which it may be performed, the same will now be described, by way of example, with reference to the accompanying drawings, in which:

FIGURE 1 is the basic circuit diagram of a permanent storage system according to the invention;

FIGURE 2 is a partial equivalent circuit diagram for explaining the choice of the resistance having regard to the parasitic couplings;

Figure 5:
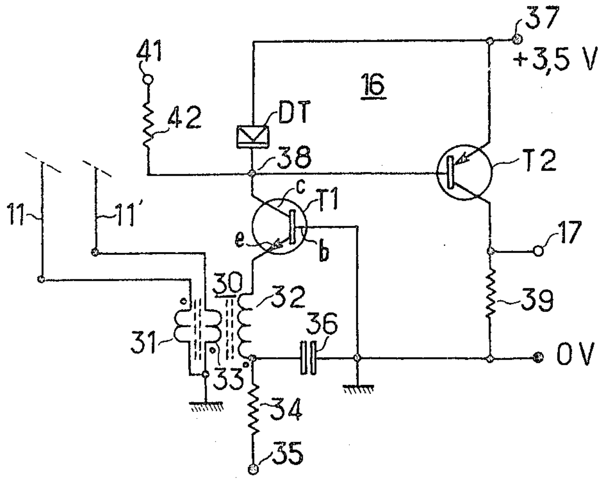

FIGURES 4*a* and 4*b* illustrate wave forms relative to the signals received by an output amplifier, and FIGURE 5 is a simplified circuit diagram of an output amplifier.

In FIGURE 1, the resistive-coupling matrix 10 is composed essentially of a set of column conductors 11, and of a set of word conductors 12, with resistive couplings provided at certain of their crossing points, such as 13, and denoted by a dot. Such an assembly may be regarded either as a permanent store, or signal-reading store, or as an encoding device.

The necessary code values are assigned to the column conductors. It is only for the sake of illustration that the values of several powers of 2 have been indicated against the column conductor shown, the true number of which may vary in accordance with requirements. Any other distribution of the code values is also possible, depending upon the coding adopted for the numerical or alphabetical characters constituting a stored word. Likewise, the number of stored words, and therefore of conductors 12, may vary in accordance with requirements, but the system according to the invention is designed particularly for a relatively high storage capacity, for example 1000 words and more. The matrix therefore comprises an equivalent number of input terminals 14. The number of conductors illustrated is obviously much smaller in order to reduce the space taken up in the drawing.

Of the crossing of each word conductor 12 with the various column conductors 11, only those to which the value of the binary 1, for example, is assigned are provided with a resistive coupling. Thus, two resistance elements comprising resistors 15 are disposed at the crossing points between the third word wire 12 from the top and the column conductors 11 of value $2^0$ and $2^1$.

Each column conductor 11 is connected to the input of an output amplifier 16, of which the terminal 17 represents the output. A resistor 18 symbolically represents the input resistance, or rather impedance, of the amplifier 16 in relation to earth or to any other reference potential.

The selection of a word to be extracted by reading may be effected by the application, to the corresponding word conductor, of a voltage pulse generated by a pulse generator 19, routed by a decoder-selector device 20, under the control of a word address register 21. In the case of a large capacity, the decoder-selector 20 may take the form of an arrangement of logical encoding diodes, completed by a matrix of transformers and of isolating diodes. The devices 19, 20, 21 will not be described in greater detail, since they may be constructed in very differing forms, depending upon the storage capacity and the desired performances, and they are known in the technique of information processing equipment.

It will be readily be appreciated that the problem to be solved is that, when a certain voltage is selectively applied to a word wire, a useful output signal must appear at the inputs of the output amplifiers connected to the column conductors corresponding to the binary positions containing a binary 1 in the selected word. The inputs of the output amplifiers connected to the column conductors whose crossings with the selected word wire do not possess any resistive coupling, must not receive any output signal, or at least if a parasitic signal occurs at one of these inputs it must have an amplitude lower than a threshold level below which the output amplifier does not supply any output signal.

In order that this may be so, the resistance of each resistor 15 must be much higher than the input impedance, represented by 18, in each amplifier 16, so that each column conductor may be regarded as being substantially connected to earth. If it is desired to determine the amplitude of the parasitic signal at a column at which a binary 0 must be read, in the neigbourhood of a column in which a binary 1 must be read, the equivalent, intentionally simplified diagram of FIGURE 2 may be examined. It will be assumed that the third word from the top of FIGURE 1 is selected by the application of a positive voltage to the corresponding word conductor. The resistor R1, FIGURE 2, represents the resistor 15 connected to the crossing point 13, while the resistor R2, FIGURE 2, represents the input impedance of the amplifier 16 of the column $2^1$. The resistor R4, FIGURE 2, represents the input impedance of the amplifier of the column $2^2$, for example. There are included in the designation R3 the resistance equivalent to the parallel connection of a number of resistors such as 15, which establish the said parasitic couplings. Now, it is found that in general, regardless of the coding adopted and the number of binary positions per word, this number of pairs of resistors cannot exceed $m/2$ if $m$ is the number of words stored by the storage system. Therefore, the resistor R3 may have in the most unfavourable case the minimum value $2R-m/2=4R/m$, where R is the value of R1 and therefore of each resistor 15. Let $r$=input impedance of an amplifier, and $K=R:r$. It is clear that the parasitic voltage which is likely to be set up at the point 23 is equal to the voltage of the useful signal at the point 22, divided by the factor:

$$1+\frac{2K}{m/2}$$

This is obviously valid only if the, albeit quite small, influence of other branches, such as those formed by the impedances of the switches included in the decoder-selector 20, which are assumed to be open, are reflected.

On the other hand, let it be assumed that the minimum ratio of the useful signal (1) to the parasitic signal (0) is fixed in advance and that the value of the ratio (1)/(0) is denoted by $d$. Since the latter ratio must be smalled than the preceding one, and after the obvious transformations, the following result is arrived at:

$$K\geq\frac{m(d-1)}{4}$$

Thus, if $d$ is made equal to 5 and $m$ is made equal to 1000, it is found that each resistor 15 must have a value at least 1000 times higher than the input impedance of the output amplifier. It is clear that, in order to retain a resistance of reasonable value for each resistor 15, it is necessary to have available a type of output amplifier which is endowed with very low input impedance. It is therefore recommended to employ an output amplifier such as that described in the aforesaid U.S. patent application Ser. No. 374,496.

FIGURE 1 gives a simplified diagram of this amplifier, which is sufficient for a brief explanation of its operation.

The amplifier is composed essentially of a transistor T1, a tunnel diode DT and an input transformer 30. The latter comprises a primary winding 31, of which one end is connected to earth and the other to a column wire 11. The upper end of the secondary winding 32 is connected to the emitter of the transistor T1, while the other end is connected to earth through a decoupling capacitor 36 and is connected to a constant-current source. The latter comprises, as usual, a resistor 34 of relatively high value, which is in turn connected to a direct-voltage source through a terminal 35. It will be assumed that the terminal 35 is connected to this voltage source (not shown), which may be a battery or a voltage generator supplied by the alternating suply system. Since the impedance of the capacitor 36 is negligible, having regard to the frequency of the applied signals, it will be seen that the transistor T1 is employed in the so-called "common-base" or "ground-base" connection, because the cut-off frequency $F\alpha$ of the transistor is much higher, while the input resistance is much lower.

The diode DT has its anode connected to the terminal 37, to which is applied a unidirectional voltage of +3.5 volts, and its cathode is connected to the junction point 38, which is in turn connected to the collector *c* of the transistor T1. It is the diode DT which performs simultaneously the functions of amplification, amplitude discrimination and storage of the signal received by the device.

It is known that in a tunnel diode, also known as an "Esaki diode," the current-voltage curve has a so-called "negative resistance" region between two so-called "positive resistance" regions when it is biassed in its "forward" conducting direction. Generally speaking, a given type of tunnel diode has a peak current I*p* of well-defined value for a certain voltage at its terminals. The diode is rapidly changed to its high-voltage state when the current passing through it exceeds the value of I*p*, for example 10 milliamperes. Since, in this case, the voltage at the terminals of the diode DT does not exceed 500 millivolts, there is provided an additional amplification stage comprising a transistor T2 and a ballast resistor 39, for example of 75 ohms.

Of the elements which may be used, there may be mentioned by way of non-limiting example the transistors 2N2475 and 2N976, which are suitable for T1 and T2 respectively. The first, which is of the NPN type, must have a high coefficient $\beta$, for example above 50, and a gain $x$ frequency product, or F*t*, of the order of 600 megacycles per second. With regard to T2, it is important that this transistor of PNP type may be saturated when a relatively low voltage exists between its base and its emitter.

With regard to the transformer 30, disregarding for the moment the second primary winding 33, the windings are formed on a ferrite core for very high frequencies, of the type "Damping Bead 4B," which has the form of a rod of very small dimensions. If it is assumed that the impedance of the capacitor 36 is zero with respect to the input signals, the secondary winding 32 of the transformer 30 may be regarded as connected in parallel with the emitter-base junction of the transistor T1. Owing to the "grounded-base" arrangement, the resistance of this junction is approximately 4 ohms, and is therefore already very low. It is known that:

$$Ze1+Ze2.x^2$$

in which Z*e*1 is the input impedance as seen from the terminals of the primary winding, Z*e*2 is the impedance connected to the secondary winding, and $x$ is the ratio N1:N2 of the numbers of turns of the primary and secondary windings. The ratio $x$ may vary from 0.2 to 1:1. The value of 0.5:1 has been adopted for $x$. In this case, the primary winding 31 and the secondary winding 32 comprise 2 and 4 turns respectively. The impedance as seen at the terminals of the primary winding is therefore approximately 4 ohms×0.25=1 ohm. Under the previously indicated conditions, a value of 1200 ohms is chosen for the resistance of each resistor 15, in order to take account of the manufacturing fluctuations inherent in the components employed and to obtain an additional safety margin.

Means are provided for returning to zero each of the storage amplifiers. These means are represented in simplified form by the resistor 42, of which one end is connected to the terminal 41, which is assumed to be common to all the amplifiers. It will be seen that an appropriate generator (not shown) can apply to the terminal 41 a pulse such that a current flows through the resistor 42, with a strength at least equal to that of the peak current I*p* of the tunner diode. This current, of which the greater part flows through T1, serves to render T2 non-conductive and to return the diode DT to its low-voltage state, in which there flows through it a current I*o* fixed at 9.5 milliamperes. This current I*o*, which is nothing other than the collector current of T1, must be adjusted with precision, since it determines the discrimination threshold level. In practice, the emitter current of T1 is adjusted by varying the voltage −V applied to the terminal 35. This is the most expedient solution when it is necessary to adjust the emitter currents in a large number of amplifier-storage devices. For example, if the value of each resistor 34 is 1 kilohm, the voltage −V will be adjustable about −10 volts.

There will now be considered the instant when a voltage pulse is applied to one of the terminals 14, FIGURE 1, in order to extract by reading one of the stored words. This positive pulse, for example a voltage of 6 volts, cause equal currents to flow through the resistors 15 disposed at the crossings of the selected word wire with the column conductors of the binary positions containing the binary 1's. Since the input impedance of each amplifier is extremely low in relation to the resistance of each resistor 15, each of the transformers associated with the said column conductors is acted upon by a current of well-defined value. The increase in the emitter current which results therefrom in the corresponding secondary winding may be such that the emitter current of T1 changes rapidly to 12 ma., which causes the diode DT to change to its high-voltage state, and renders the transistor T2 conductive. When the said pulse has ended, T2 remains conductive, and the positive voltage approaching +3.5 volts which is set up at the terminal 17 is available and remains so as long as the amplifier-storage devices are not returned to zero, as previously indicated.

With regard to the amplifiers associated with the column wires corresponding to binary zeros in the extracted word, it may be assumed that the increase in the emitter current due to the parasitic couplings never reaches 0.5 ma., so that the corresponding diode DT remains in its low-voltage state and the transistor T2 remains non-conductive.

For reasons of space requirement and cost, it is normal to produce the above-described permanent store by industrial methods which render possible miniaturisation and a good reproducibility of the manufactured elements. To this end, the printed circuit technique is applied. The matrix 10 may therefore consist of a number of plates which are interconnected after having been finished. Each plate is formed of a thin insulating sheet of rectangular shape, having secured to one face a set of column conductors 11 and to the other face a number of word conductors 12. The conductors on the two faces are obviously disposed in two directions perpendicular to one another. Each column conductor comprises, at each crossing with a word wire, a tongue forming an extension, so that each column conductor has the appearance of a comb. The resistors 15 are formed by the deposition of strips of an electrically resistive material on the top of the aforesaid tongues. This deposition is similar to the production of the resistive paths in potentiometers and may be carried out with the aid of masks or by spraying by means of a gun. Metallised eyelets extend through the insulating sheet to effect, at the desired crossings, the electrical connection of each resistive element with the word conductor situated opposite thereto on the other face.

Each word or column conductor in the form of a thin strip therefore has an appreciable width and it is clear that each crossing point forms a small capacitor, as illustrated at 24 in FIGURE 1. The capacitive couplings thus formed have harmful effects which may be fairly readily eliminated as long as the reading period of the store does not fall below 500 nanoseconds. However, it is desirable to be able to extract a word from the store in a much shorter cycle time, for example every 50 nanoseconds. The selecting signal is then necessarily a voltage pulse having steep edges, and when a word wire is subjected to such a pulse the transient capacitive currents received by all the output amplifiers may be higher than the current normally expected which corresponds to the reading of a binary 1. Obviously, this problem could be solved by a sampling applied to the center of the selecting pulse, but if would then be necessary to provide additional equipment without attaining the desirable rapidity of operation.

A much more satisfactory solution to this prob'em is achieved by providing means for completely cancelling out the transient capacitive currents when they arrive at all the output amplifiers.

Figure 3:
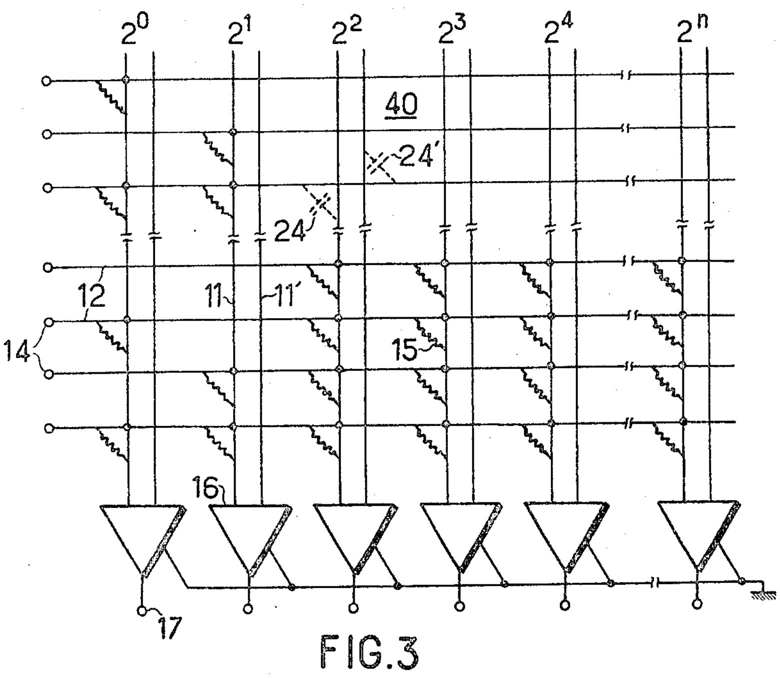
FIGURE 3 is the circuit diagram of the resistive-coupling matrix for obtaining improved performances.

FIGURE 3 illustrates a resistive-coupling matrix 40, which is substituted for the matrix 10 of FIGURE 1. Equivalent elements bear the same reference numerals in the two figures. It may be observed that the matrix 40 is identical to the matrix 10, except that two column conductors 11 and 11' are provided for each binary position or column. The normal conductor 11 is employed to effect the resistive couplings at the desired crossing points. There is no resistive coupling between the additional conductors 11' and the word conductors 12. There is thus produced at each double crossing a capacitor 24 and a capacitor 24' of identical value. Adverting to FIGURE 5, it will be seen that, in each amplifier 16, the input transformer 30 is provided with a second primary winding 33, of which one end is connected to the additional column conductor 11'. The second primary winding 33 comprises the same number of turns as the first primary winding 31, but its coupling direction in relation to the secondary winding 32 is opposite to that of the first primary winding 31.

Referring now to FIGURE 4*a* and 4*b*, the case will be dealt with in which an output amplifier is to receive a signal representing a binary 1. At the selecting pulse, the current flowing through the first primary winding 31 is reprsented in FIGURE 4*a* by the wave form composed of the portions 25, 26 and 27. The peaks 25 and 27 are due to the transient capacitive currents corresponding to the leading and trailing edges respectively of the selecting signal. The current flowing through the second primary winding 33 is illustrated by the wave form 43, FIGURE 4*b*, on which there will be seen the positive and negative peaks due to the transient capacitive currents equal to the preceding ones. As a result of the fact that the coupling directions of the two primary windings 31 and 33 are the inverse of one another, the capacitive currents cancel one another out at each instant and the useful signal ultimately set up at the secondary winding of the transformer has the same form as the trapezoidal pulse formed in FIGURE 4*a* by the portions 28, 26 and

29. Thus, the effects of the parasitic capacitances have been completely eliminated.

Considering the case of any output amplifier which is to receive a signal representing a binary zero, the form of the currents received by each of the first and second primary windings 31 and 33 is represented by the wave form 43, FIGURE 4*b*, and it is obvious that, in this case also, the transient capacitive currents are cancelled out.

With a selecting signal of a duration of 25 ns. (nanoseconds), followed by a time delay of 15 ns. before the application of a return-to-zero signal of a duration of 10 ns., reading cycles of the permanent store may be made as short as 50 ns.

The circuit arrangement described is particularly economical. Other circuit arrangements could be envisaged, notably one in which the wires 11 and 11' of each column are connected to two separate transformers having inverse magnetic couplings and each acting on a separate input transistor. Although a single tunnel diode may be sufficient for such a modified output amplifier, the cost of the latter would be a little higher than that described. Other modifications would be possible, notably those resulting from the adoption of transistors having opposite polarities to those indicated.

I claim:

1. A permanent memory system for storing a number *m* of data words each with a bit quantity not exceeding a number *n* comprising:

a number *m* of "word" conductors each allocated to a word to be stored, a number *n* of "column" conductors each corresponding to a different bit, means for locating said column conductors transversely of and near to said word conductors, resistance elements connected to effect resistive couplings at cross-over points of each word conductor with said column conductors, but only at such cross-over points where a given binary value should be stored in accordance with the word allocated to that word conductor, a number *n* of output amplifiers, one for each bit position and, a number *n* of second "column" conductors identical and parallel to the first "column" conductors, one for each bit position, wherein each of said output amplifiers includes a transformer with a secondary winding and two primary windings respectively connected to said first and second column conductors and oppositely coupled with regard to said secondary winding to nullify the transient currents resulting from capacitive couplings upon the setting of a word conductor under or out of voltage, each output amplifier further including a transistor having its base electrode connected to a point of reference potential and its emitter electrode connected to a first terminal of said secondary winding, and a substantially constant current source connected to the other terminal of said secondary winding.

References Cited

UNITED STATES PATENTS

| | | | |
|---|---|---|---|
| 3,144,641 | 8/1964 | Raffel | 340—174 |
| 3,318,993 | 5/1967 | Beelitz | 340—173 X |

BERNARD KONICK, *Primary Examiner.*

J. F. BREIMAYER, *Assistant Examiner.*